United States Patent [19]

Chi

[11] Patent Number: 4,850,456
[45] Date of Patent: Jul. 25, 1989

[54] QUICK ADJUSTING DEVICE FOR BICYCLE BRAKE CABLE

[76] Inventor: Yi Chen Chi, No. 139-5, An Mei Rd., Hou Li Hsiang, Taichung Hsien, Taiwan

[21] Appl. No.: 304,196

[22] Filed: Jan. 31, 1989

[51] Int. Cl.$^4$ .............................................. B62L 1/06
[52] U.S. Cl. .................................. 188/24.19; 74/505; 188/2 D; 188/24.21; 188/71.7; 188/196 M; 254/216
[58] Field of Search ............... 188/24.19, 24.21, 24.12, 188/2 D, 196 M; 74/89.2, 89.22, 505, 506, 501.5 R, 10.6, 10.7, 10.85; 254/216, 250; 24/68 R, 68 CD, 68 B, 69 ST, 69 CT, 69 R

[56] References Cited

U.S. PATENT DOCUMENTS

| 711,443 | 10/1902 | Sharp | 188/2 D |
|---|---|---|---|
| 4,026,390 | 5/1977 | Yoshigai | 188/2 D |

FOREIGN PATENT DOCUMENTS

| 10417 | 4/1980 | European Pat. Off. | 188/24.21 |
|---|---|---|---|
| 961677 | 5/1950 | France | 188/24.12 |

Primary Examiner—George E. A. Halvosa
Attorney, Agent, or Firm—Morton J. Rosenberg

[57] ABSTRACT

The present invention relates to a quick adjusting device for bicycle cables, and especially to a device having a substantially S-shaped base which cooperates with a cam, a worm and a worm gear to adjust a bicycle brake cable. Two plates formed on the bottom of the base to define an area. A wheel is slidably mounted on the cam. The worm gear and the wheel, together, clamp the brake cable. The brake cable is driven and adjusted by the worm gear and the wheel by inserting a hexagon wrench into a hexagonal slotted head of the worm and turning. A pulley is rotatably received in an area of the base for adjusting the relative position of the left side and the right side brake arms.

1 Claim, 3 Drawing Sheets

PRIOR

QUICK ADJUSTING DEVICE FOR BICYCLE BRAKE CABLE

BACKGROUND OF THE INVENTION

The present invention relates to a quick adjusting device for bicycle brake cables, and especially to a device having a substantially S-shaped base, a camshaft, a worm, a worm gear shaft, and a pulley. Two plates are formed on the bottom of the base and define an area. The worm gear and the wheel, together, clamp a brake cable. The wheel is located on the camshaft. The brake cable is driven by the worm to move upwards or downwards via the worm gear and the wheel. A pulley is received in an area of the base and used to adjust the relative position of the left side and the right side brake arms.

Conventional bicycles use cross-type brake arm in their brake devices. In another type of bicycle brake device, the brake arms is installed independently on a right side and a left side of the front and rear forks of the bicycles. The brake cables of these bicycle brake devices are easy to loosen but not easy to adjust after it has been used for a period of time. Furthermore, if two brake arms of the bicycle are not in the right position, it is very difficult to adjust.

SUMMARY OF THE INVENTION

It is an object of the present invention to provide a quick adjusting device for bicycle cables.

Another object of the present invention is to provide a device having a base which cooperates with a worm, a worm gear, and a wheel to adjust the brake cable to an optimum length.

It is still another object of the present invention to provide a pulley to adjust the brake arms easily.

Other objects and advantages will be apparent to those skilled in the art upon reading the detailed description provided hereinbelow with appropriate reference to the accompanied drawings.

DETAILED DESCRIPTION OF THE PREFERRED EMBODIMENT

Figure 1:
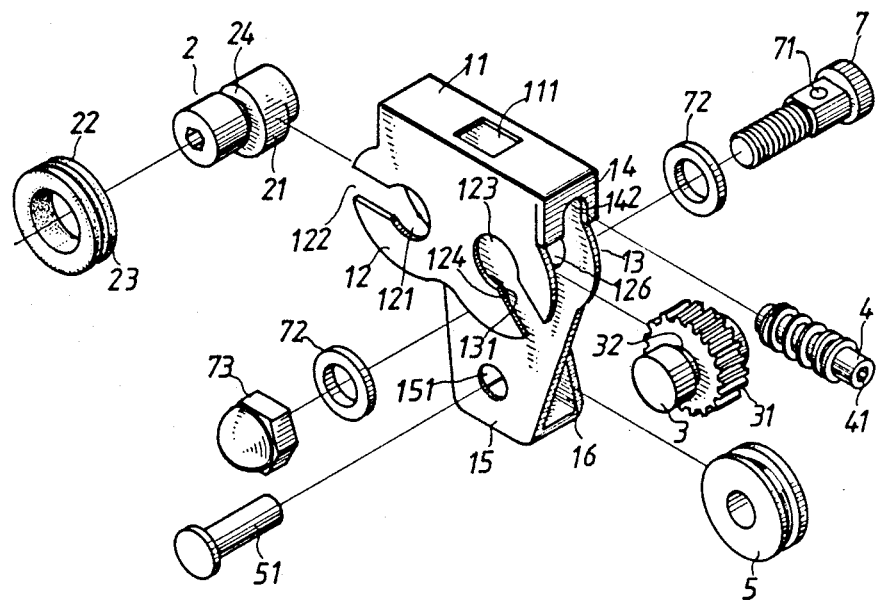
FIG. 1 is an exploded view of a quick adjusting device for bicycle cables in accordance with the present invention.
Figure 2:
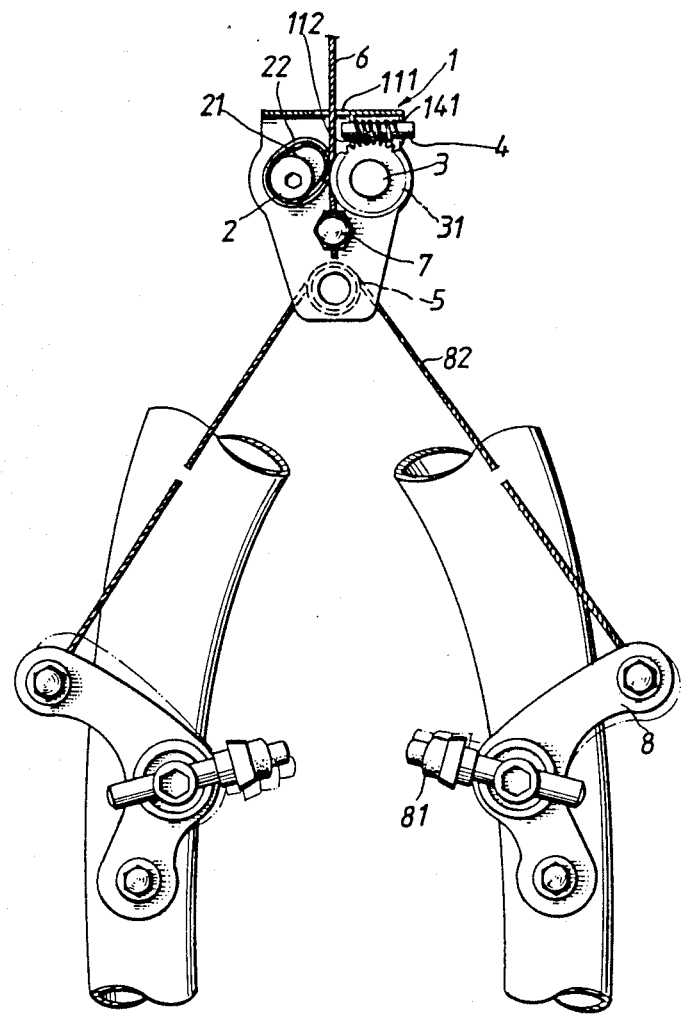
FIG. 2 is across-sectional view of an assembly of a preferred embodiment of the quick adjusting device for bicycle cables in accordance with the present invention.
Figure 3:
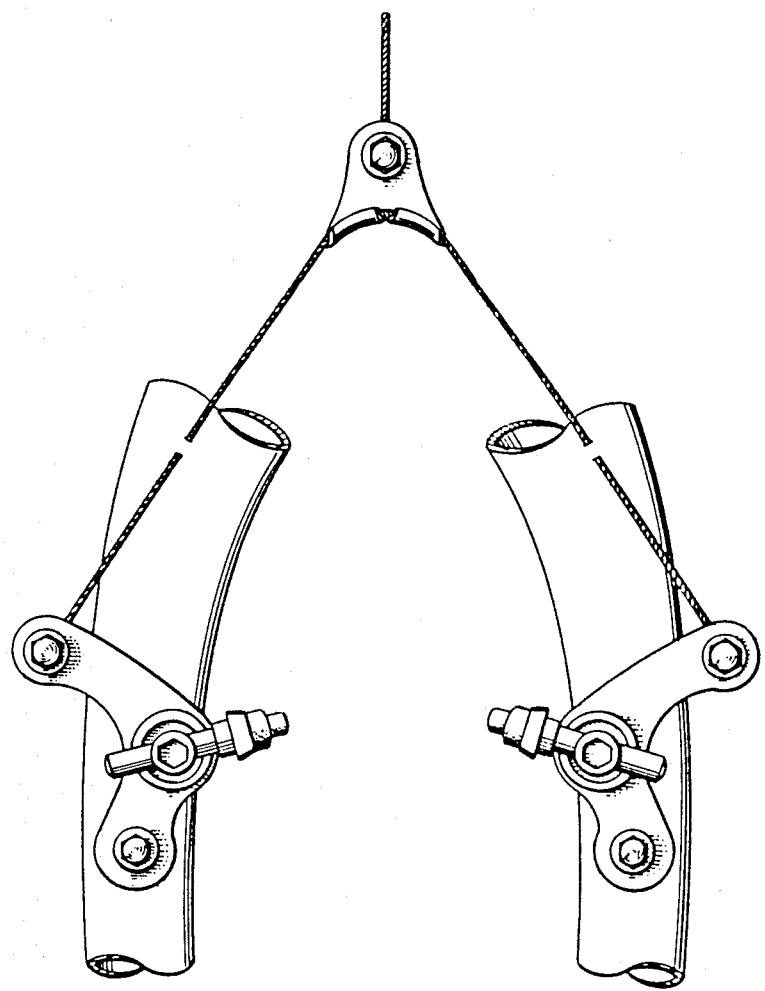
FIG. 3 is a cross-sectional view of a conventional bicycle brake arm and brake cable assembly.

Referring now to FIG. 1 and 2, a quick adjusting device for bicycle cables of the present invention comprises a base 1, a camshaft 2, a worm gear shaft 3, a worm 4 and a pulley 5.

The base 1 is substantially S-shaped and has a top wall 11, a front wall 12, a rear wall 13, a right wall 14 and two plates 15. The two plates 15 are forked from a bottom portion of the rear wall 13 and define an area 16. The top wall 11 has an aperture 111 to let the brake cable 6 pass through. The right wall 14 has an opening 142 for installing the worm 4. The right wall 14 and a small plate 112, having a hole, together form a worm bracket 141. The small plate 112 protrudes from an inner side of the top wall 11. The front wall 12 has a cam-hole 121 which includes a first slot 122 and a worm-gear-hole 123. The worm-gear-hole 123 also has a second slot 124 thereon. The cam-hole 121 and the wormgear-hole 123 are in the same plane. The first slot 122 and second slot 124 extend outward in approximate opposite directions to each other. The rear wall 13 has a first hole (not shown) and a second hole 126, respectively in line with the cam-hole 121 and the worm-gear-hole 123 in the front wall 12. A pair of pulley holes 151 are formed symmetrically on the two plates 15. A fixing hole 131 is formed at a lower part of the rear wall 13.

The camshaft 2 has a cam 21 formed thereon and a wheel 22 rotatably mounted on the cam 21. An annular slot 23 is formed on the wheel 22. A first journal 24 is formed adjacent to the cam 21. The camshaft 2 is mounted to the cam-hole 121 and the first hole via the first journal 24 through the first slot 122 and riveted to to base 1.

The worm gear shaft 3 has a worm gear 31 which is slidably and rotatably mounted thereon, and a second journal 32 formed adjacent to the worm gear 31. The worm gear shaft 3 is mounted to the worm-gear-hole 123 and the second hole 126 via the second journal 32 through the second slot 124 and riveted to the base 1.

The worm 4 is mounted on the worm bracket 141 and attached above and in contact with the worm gear 31. The worm 4 has a hexagon slotted head 41. The worm gear 31 is driven by the worm 4 by means of inserting a hexagonal wrench into the hexagonal slotted head 41 and turning.

The pulley 5 is rotatably mounted on a pulley shaft 51 within the area 16 between the two plates 15. The pulley shaft 51 is put into the pair of pulley holes 151 and riveted to the base 1.

The wheel 22 is preferably made of elastic material. The brake cable 6 first passes through the aperture 111 of the top wall 11 and then passes through the space between the annular slot 23 and the worm gear 31. The annular slot 23 and the worm gear 31, together, clamp the brake cable 6 tightly. Since the wheel 22 is elastic, the brake cable 6 is pushed to contact the worm gear 31. When the brake cable 6 is too loose and needs tightening, a hexagon wrench is inserted into the hexagonal slotted head 41 of the worm gear 4 to drive the worm gear 31 and adjust the brake cable 6. When the worm gear 31 is driven counterclockwise, the teeth of the worm gear 31 and the wheel 22 together force the cable 6 to move downward. Since the wheel 22 is slidably and rotatably mounted on the cam 21, the wheel 22 slides relative to the cam 21 while the cam 21 does not move to assure the wheel 22 contacts to the worm gear 31. A screw 7, two washers 72 and a nut 73 are used to fix the end of the brake cable 6 in a cable hole 71 of the screw 7. The whole adjusting or installing procedure is completed after the brake cable 6 is released.

Furthermore, the brake arm cable 82 first encircles the pulley 5, and then attaches to two brake arms 8. The two brake arms 8 extend outward due to two springs (not shown in the Figures) on the two brake arms 8. The brake arm cable 82 also is in tension and provides sufficient friction between the pulley 5 and the brake cable 82. When the pulley 5 turns, the brake arm cable 82 also moves due to the frictional force. When the two brake arms 8 are not in a proper position, the two brakes 81 of the two brake arms 8 can not touch the bicycle wheel simultaneously. Adjustment is made simply by turning the pulley 5 to move the brake arm cable 82 and make the two brake arms 8 adjust to the correct proper position.

As various possible embodiments might be made of the above invention without departing from the scope of the invention, it is to be understood that all matter herein described or shown in the accompanying drawings is to be interpreted as illustrative and not in a limiting sense. Thus it will be appreciated that the drawings are exemplary of a preferred embodiment of the invention.

I claim:

1. A quick adjusting device for a bicycle brake cable comprising:

(a) a substantially S-shaped base having a top wall, a front wall, a rear wall, a right wall and two plates, said two plates being forked from a bottom portion of said rear wall and defining an area, said top wall having an aperture for a brake cable to pass through, said right wall having an opening for installing a worm, said right wall and a small plate, having a hole, together forming a worm bracket, said small plate protruding from an inner side of the top wall, said front wall having a cam-hole which includes a first slot and a worm-gear-hole, said cam-hole and said worm-gear-hole being in the same plane, said worm-gearhole having a second slot thereon, said first slot and second slot extending outward in opposite directions, said rear wall having a first and a second hole respectively in line with said cam-hole and worm-gearhole of said front wall, a pair of pulley holes formed symmetrically on said two plates, a fixing hole being formed at a lower part of said rear wall;

(b) a camshaft having a cam being formed thereon and a wheel being rotatably mounted on said cam, an annular slot being formed on said wheel, a first journal being formed adjacent to said cam, said camshaft being mounted to said cam-hole and said first hole via said first journal through said first slot and riveted to said base;

(c) a worm gear shaft having a worm gear which is slidably mounted thereon, and a second journal formed adjacent to said worm gear, said worm gear shaft being mounted to said worm-gear-hole and said second hole via said second journal through said second slot and riveted to said base;

(d) a worm, having a hexagonal slotted head, said worm being mounted on said worm bracket and attached above and in contact with said worm gear, said worm gear driven by said worm by inserting a hexagonal wrench into said hexagon slotted head and turning;

(e) a pulley, rotatably mounted on a pulley shaft within said area between said two plates, said pulley shaft located between said pair of pulley holes of said two plates and riveted to said base;

(f) a brake cable first passing through said aperture of said top wall and then passing through a space between said annular slot of said wheel and said worm gear, said annular slot and said worm gear together clamping said brake cable tightly;

(g) a screw, two washers and a nut to fix an end of said brake cable in a cable hole of said screw;

(h) a brake arm cable first encircling said pulley and attached to two brake arms, said pulley movable to adjust and make said two brake arms properly positioned.

* * * * *